US012030212B2

(12) United States Patent
Hume

(10) Patent No.: US 12,030,212 B2
(45) Date of Patent: Jul. 9, 2024

(54) MOLD LINER ARRANGEMENT

(71) Applicant: VERTECH HUME PTY LTD, Werribee (AU)

(72) Inventor: Tamas Dale Hume, Werribee (AU)

(73) Assignee: VERTECH HUME PTY LTD, Werribee (AU)

( * ) Notice: Subject to any disclaimer, the term of this patent is extended or adjusted under 35 U.S.C. 154(b) by 390 days.

(21) Appl. No.: 17/278,622

(22) PCT Filed: Sep. 25, 2019

(86) PCT No.: PCT/AU2019/000118
§ 371 (c)(1),
(2) Date: Mar. 22, 2021

(87) PCT Pub. No.: WO2020/061613
PCT Pub. Date: Apr. 2, 2020

(65) Prior Publication Data

US 2022/0032502 A1 Feb. 3, 2022

(30) Foreign Application Priority Data

Sep. 25, 2018 (AU) ................................ 2018903609

(51) Int. Cl.
*B28B 13/02* (2006.01)
*B28B 7/34* (2006.01)
(Continued)

(52) U.S. Cl.
CPC .......... *B28B 13/0275* (2013.01); *B28B 7/344* (2013.01); *B28B 7/364* (2013.01);
(Continued)

(58) Field of Classification Search
CPC ........... B28B 7/46; B28B 7/344; B28B 7/364; B28B 13/0275
See application file for complete search history.

(56) References Cited

U.S. PATENT DOCUMENTS 4,289,724 A * 9/1981 Baynard ............... B29C 39/026 108/150
4,996,013 A * 2/1991 Hume ..................... B28B 21/18 425/84
(Continued)

FOREIGN PATENT DOCUMENTS

CH 665244 A5 * 4/1988
CH 665244 A5 4/1988
(Continued)

OTHER PUBLICATIONS

International Search Report mailed Dec. 18, 2019, issued in corresponding International Application No. PCT/AU2019/000118, filed Sep. 25, 2019, 4 pages.
(Continued)

*Primary Examiner* — Nahida Sultana
*Assistant Examiner* — Virak Nguon
(74) *Attorney, Agent, or Firm* — Christensen O'Connor Johnson Kindness PLLC

(57) ABSTRACT

A mould liner for a fabrication assembly is disclosed. The fabrication assembly is for fabricating an elongate concrete article in a substantially upright orientation and includes a core assembly and an outer mould assembly defining a mould cavity between the core assembly and an inner moulding surface of the outer mould assembly with the outer mould assembly being separable following casting of the elongate concrete article to strip the outer mould assembly from the elongate concrete article. The mould liner during casting forms an intermediate layer between the inner moulding surface of the outer mould assembly and the elongate concrete article being cast, wherein on stripping of the core and outer mould assemblies following casting, the mould liner is adapted to form an outer containment layer to the elongate concrete article.

28 Claims, 7 Drawing Sheets

(51) Int. Cl.

| | |
|---|---|
| ***B28B 7/36*** | (2006.01) |
| ***B28B 7/46*** | (2006.01) |
| ***B28B 23/18*** | (2006.01) |
| ***E02D 5/30*** | (2006.01) |
| ***E04H 12/12*** | (2006.01) |

(52) U.S. Cl.
CPC .............. *B28B 7/46* (2013.01); *B28B 13/021* (2013.01); *B28B 23/18* (2013.01); *E02D 5/30* (2013.01); *E04H 12/12* (2013.01)

(56) References Cited

U.S. PATENT DOCUMENTS

| | | | | |
|---|---|---|---|---|
| 6,284,172 | B1 | 9/2001 | Hume | |
| 6,878,323 | B2 | 4/2005 | Fyfe | |
| 6,938,390 | B2 | 9/2005 | Maeda et al. | |
| 2003/0101676 | A1* | 6/2003 | Maeda | B29C 70/003 52/649.1 |
| 2013/0270727 | A1 | 10/2013 | Bauer-Juarez | |

FOREIGN PATENT DOCUMENTS

| | | | |
|---|---|---|---|
| EP | 2821194 | A1 | 1/2015 |
| FR | 1352302 | A * | 2/1964 |
| FR | 1352302 | A | 2/1964 |
| WO | 2005/095095 | A1 | 10/2005 |
| WO | 2014/165926 | A1 | 10/2014 |

OTHER PUBLICATIONS

Written Opinion of the International Searching Authority mailed Dec. 18, 2019, issued in corresponding International Application No. PCT/AU2019/000118, filed Sep. 25, 2019, 6 pages.

* cited by examiner

MOLD LINER ARRANGEMENT

PRIORITY DOCUMENTS

The present application claims priority from Australian Provisional Patent Application No. 2018903609 titled "MOULD LINER ARRANGEMENT" and filed on 25 Sep. 2018, the content of which is incorporated by reference in its entirety.

INCORPORATION BY REFERENCE

The following publication is referred to in the present application and its contents are incorporated by reference in their entirety:

International Patent Application No. PCT/AU2014/000404 (WO 2014/165926) titled "METHOD AND SYSTEM FOR FABRICATION OF ELONGATE CONCRETE ARTICLES", filed on 11 Apr. 2014, in the name of Vertech Hume Pty Ltd.

TECHNICAL FIELD

The present disclosure relates to the fabrication of elongate concrete articles such as poles, piles or pipes. In a particular form, the present disclosure relates to process improvements for facilitating the mass production of these concrete articles.

BACKGROUND

The present Applicant has developed a vertical casting system for fabricating elongate concrete articles such as poles and the like that includes the steps of introducing a concrete mix having a relatively high water to cement ratio into a fabrication assembly consisting of a core assembly and an outer mould. The concrete mix is then dewatered in a first stage as it is pumped generally upwardly against gravity into the mould cavity that formed between the core assembly and the fabrication assembly by controlling the release of water resulting from the combined head pressure and pump pressure of the concrete mix as the concrete mix is pumped into the mould cavity. The concrete mix is then further dewatered in a second stage following filling of the mould assembly.

Once the concrete reaches a compressive strength of approximately 2-3 MPa it is possible to remove the concrete product from the mould and place it in a curing chamber. Aspects of this vertical casting system are described in International Patent Application No. PCT/AU2014/000404 (WO 2014/165926) titled "METHOD AND SYSTEM FOR FABRICATION OF ELONGATE CONCRETE ARTICLES" whose entire contents are incorporated by reference into this specification.

While the vertical casting process has addressed a number of issues relating to initial casting of the concrete article, there is still some variability in the time between the mould assembly being filled and the concrete developing suitable strength for the subsequent stripping or removal of the mould assembly to allow the concrete article to be then cured. This is due primarily to temperature effects including ambient temperature and the temperature of components of the casting system, including the concrete mix, which affect the hydration speed of the concrete mix and as a result its strength. Removal of the mould assembly where the concrete has not reached a suitable surface strength can lead to surface defects as the inner mould surface of the outer mould will not release from the concrete article.

In an attempt to address this issue, latex based flexible materials have been employed as a liner between the inner mould surface of the outer mould and the concrete mix to assist in the release of the mould from the concrete article following casting. The latex liner is designed and fabricated to have an initial circumference that is smaller than the mould that supports the liner. When concrete is pumped into the mould, the latex liner will expand due to the pressure of the concrete until it eventually comes into contact with the inner mould surface of the outer mould which then limits any further expansion during casting.

Upon opening of the mould, ie, by separating the mould halves, the latex liner is intended to return to its original or relaxed configuration in the process sliding over the fresh concrete surface of the moulded article in the process breaking the surface tension between the latex liner and the fresh concrete to, in theory, allow removal of the newly cast concrete article from the mould liner. In addition to reducing surface defects, the latex liner would reduce the need to continually clean the moulding surfaces of the outer mould.

However, it has been found that these latex liners can be damaged easily in a manner that cannot be easily repaired. In addition, the flexible liner tends to sag and deform within the mould assembly which can also affect the surface finish of the resultant concrete article due to creases and folds in the liner material.

While the use of a latex liner has provided some improvement to the release characteristics of the mould assembly, operator misjudgement as to timing of when the concrete article may be stripped from the mould can still result in the surface of the concrete remaining on the mould liner during removal of the outer mould and a mould liner which is unsightly. Additionally, concrete will build up on the liner surface resulting in the liner requiring scrubbing in a solution of a hydrochloric acid which is not only time consuming but also a potentially hazardous activity. As would be appreciated, damage to the mould liner will cause a halt in production until the mould liner is fixed.

There is therefore a need for a fabrication method for forming elongate concrete articles capable of addressing or at least ameliorating one or more of the above disadvantages or to provide a useful commercial alternative.

SUMMARY

In a first aspect, the present disclosure provides a mould liner for a fabrication assembly, the fabrication assembly for fabricating an elongate concrete article in a substantially upright orientation and including a core assembly and an outer mould assembly defining a mould cavity between the core assembly and an inner moulding surface of the outer mould assembly with the outer mould assembly being separable following casting of the elongate concrete article to strip the outer mould assembly from the elongate concrete article, the mould liner during casting forming an intermediate layer between the inner moulding surface of the outer mould assembly and the elongate concrete article being cast, wherein on stripping of the core and outer mould assemblies following casting, the mould liner is adapted to form an outer containment layer to the elongate concrete article to form a mould liner and contained elongate concrete article combination.

In another form, the mould liner is configured to allow the removal of the mould liner and contained elongate concrete article combination from the fabrication assembly.

In another form, the mould liner is formed as a sleeve having the shape and configuration of the elongate concrete article being cast.

In another form, the mould liner is removable from the elongate concrete article as a unitary item following casting.

In another form, the mould liner is removed from the elongate concrete article by peeling the mould liner from the elongate concrete article.

In another form, the mould liner is formed from a woven fabric material.

In another form, the woven fabric material has a tensile strength (warp/weft) of greater than 2250/2000 N/50 mm.

In another form, the woven fabric material is formed from a synthetic plastic material.

In another form, the mould liner includes a hydrophobic coating.

In another form, the hydrophobic coating is a synthetic hydrophobic plastic material.

In another form, the mould liner is formed from a single sheet of material.

In a second aspect, the present disclosure provides a fabrication assembly for fabricating an elongate concrete article in a substantially upright configuration, including:

a core assembly;

an outer mould assembly defining a mould cavity between the core assembly and an inner moulding surface of the outer mould assembly, the outer mould assembly being separable following casting of the elongate concrete article to strip the outer mould assembly from the elongate concrete article;

a mould liner forming an intermediate layer between the inner moulding surface of the outer mould assembly and the elongate concrete article being cast, the mould liner on stripping of the core and outer mould assemblies forming an outer containment layer to the elongate concrete article to form a mould liner and contained elongate concrete article combination; and a concrete mix input assembly for introducing a concrete mix into the mould liner.

In another form, the mould liner is configured to allow the removal of the mould liner and contained elongate concrete article combination from the fabrication assembly.

In another form, the mould liner is formed as a sleeve having the shape and configuration of the elongate concrete article being cast.

In another form, the mould liner is removable from the elongate concrete article as a unitary item following casting.

In another form, the mould liner is removed from the elongate concrete article by peeling the mould liner from the elongate concrete article.

In another form, the mould liner is formed from a woven fabric material.

In another form, the woven fabric material has a tensile strength (warp/weft) of greater than 2250/2000 N/50 mm.

In another form, the woven fabric material is formed from a synthetic plastic material.

In another form, the mould liner includes a hydrophobic coating.

In another form, the hydrophobic coating is a synthetic hydrophobic plastic material.

In another form, the mould liner is formed from a single sheet of material.

In another form, the fabrication assembly includes a mould assembly interface arrangement located between the outer mould assembly and the mould liner to mould a concrete article having a different configuration to that of the outer mould assembly.

In another form, the mould assembly interface arrangement is separable following casting of the elongate concrete article.

In another form, the mould assembly interface arrangement transfers the radial compressive forces from the outer mould assembly to maintain the shape of the mould liner during the casting process.

In a third aspect, the present disclosure provides a method for fabricating an elongate concrete article, including:

casting a concrete article in a substantially upright configuration in a fabrication assembly, the fabrication assembly including:

a core assembly;

an outer mould assembly defining a mould cavity between the core assembly and an inner moulding surface of the outer mould assembly, the outer mould assembly being separable following casting of the elongate concrete article to strip the outer mould assembly from the elongate concrete article; and a mould liner forming an intermediate layer between the inner moulding surface of the outer mould assembly and the elongate concrete article being cast;

stripping the core and outer mould assemblies from the mould liner and elongate concrete article combination following the introduction of concrete into the mould cavity, wherein the mould liner forms an outer containment layer to the elongate concrete article to contain the elongate concrete article to form a mould liner and contained elongate concrete article combination; and removing the mould liner from the elongate concrete article for post processing.

In another form, the mould liner is formed as a sleeve having the shape and configuration of the elongate concrete article being cast.

In another form, the mould liner is removed from the elongate concrete article as a unitary item.

In another form, removing the mould liner includes peeling the mould liner from the elongate concrete article.

In another form, following stripping of the core and outer mould assemblies, the mould liner and concrete article combination are removed from the fabrication assembly.

In another form, casting the concrete article includes introducing the concrete mix into the fabrication assembly; and dewatering the introduced concrete in a two stage dewatering process.

BRIEF DESCRIPTION OF DRAWINGS

Embodiments of the present disclosure will be discussed with reference to the accompanying drawings wherein.

In the following description, like reference characters designate like or corresponding parts throughout the figures.

DESCRIPTION OF EMBODIMENTS

Figure 1:
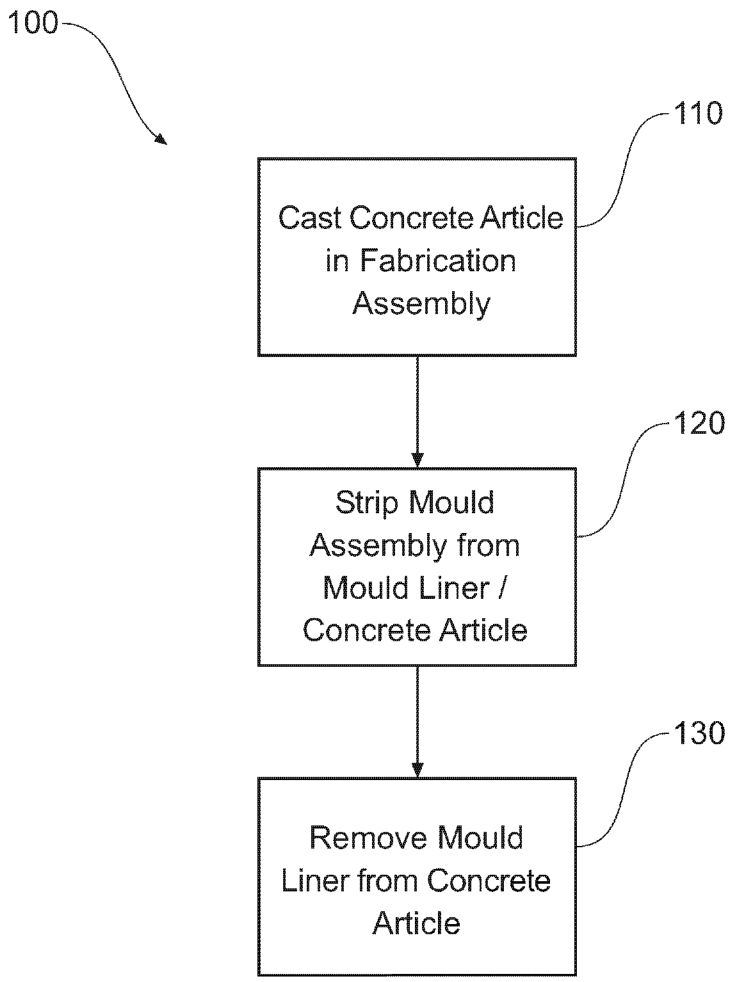
FIG. 1 is a flow chart diagram of a method for fabricating an elongate concrete article in accordance with an illustrative embodiment.

Referring now to FIG. 1, there is shown a flow chart diagram of a method 100 for fabricating an elongate concrete article according to an illustrative embodiment. In this illustrative embodiment, the present disclosure is discussed in relation to a 12.5 metre hollow section 8/16 kN slack cage tapered cylindrical concrete pole having a general wall thickness of 65 mm and suitable for the distribution of power. As would be appreciated by those skilled in the art, the present disclosure will be equally applicable to other hollow concrete articles including, but not limited to piles, poles or pipes either of constant cross section or varying cross sectional size and profile.

Figure 2:
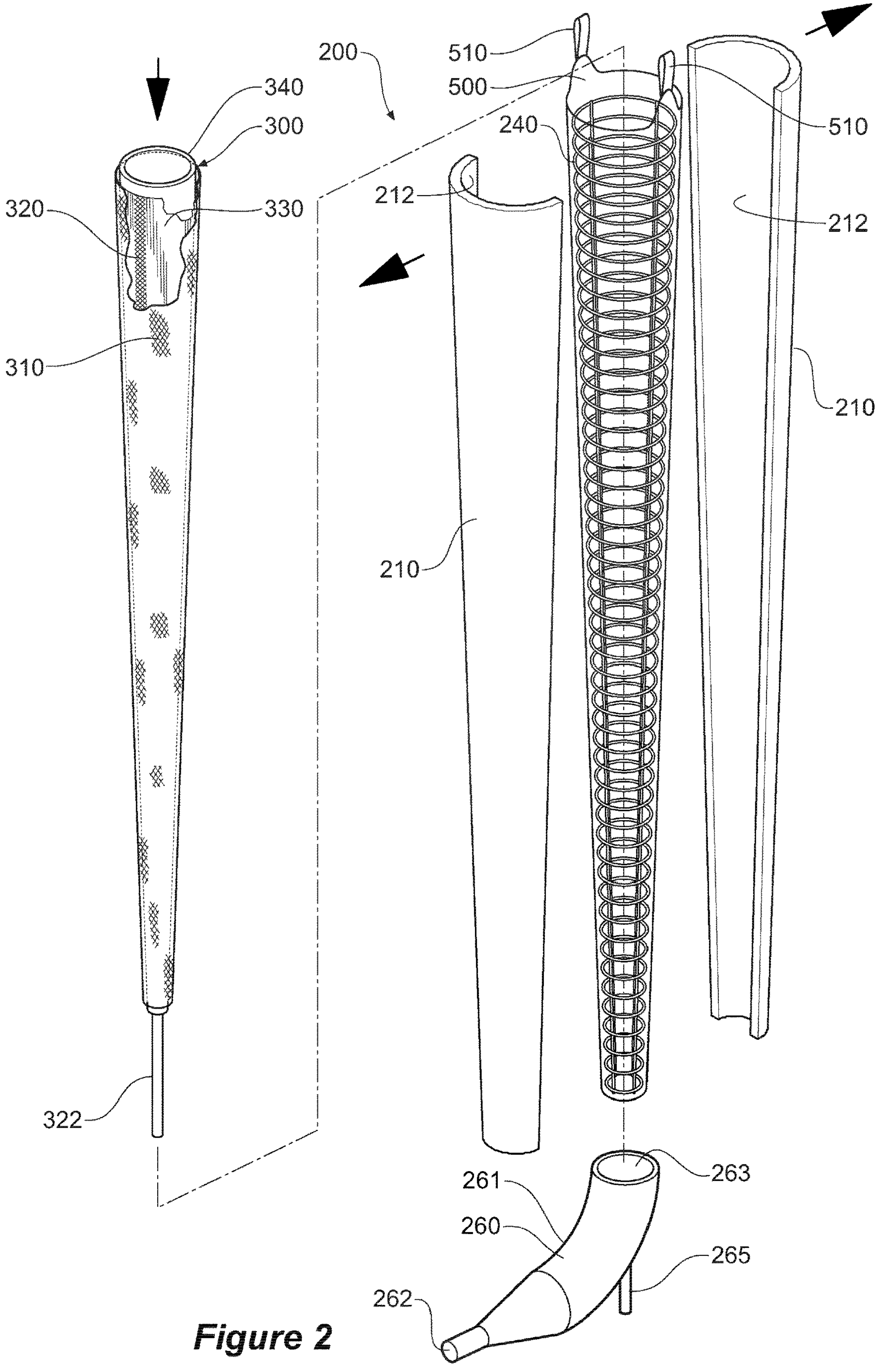
FIG. 2 is an exploded perspective view of a fabrication assembly for an elongate concrete article incorporating a mould liner in accordance with an illustrative embodiment.
Figure 3:
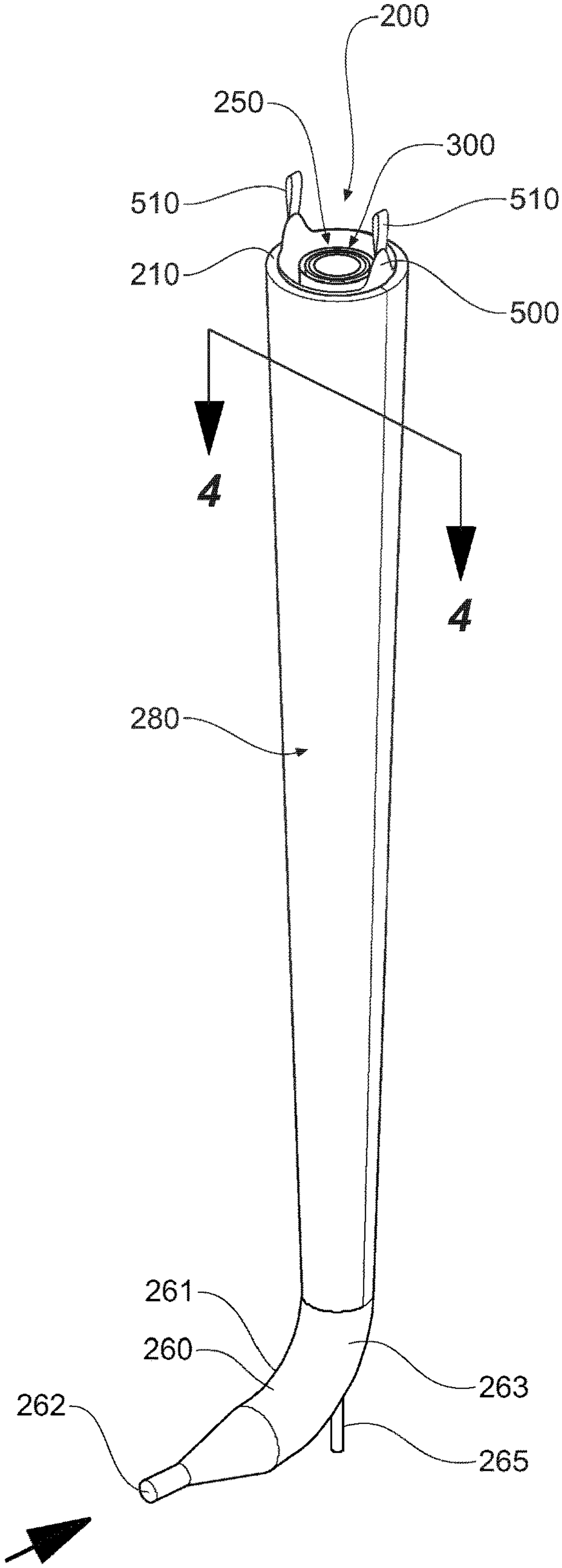
FIG. 3 is a perspective view of the fabrication assembly illustrated in FIG. 1 in an assembled configuration prior to filling with concrete mix.
Figure 4:
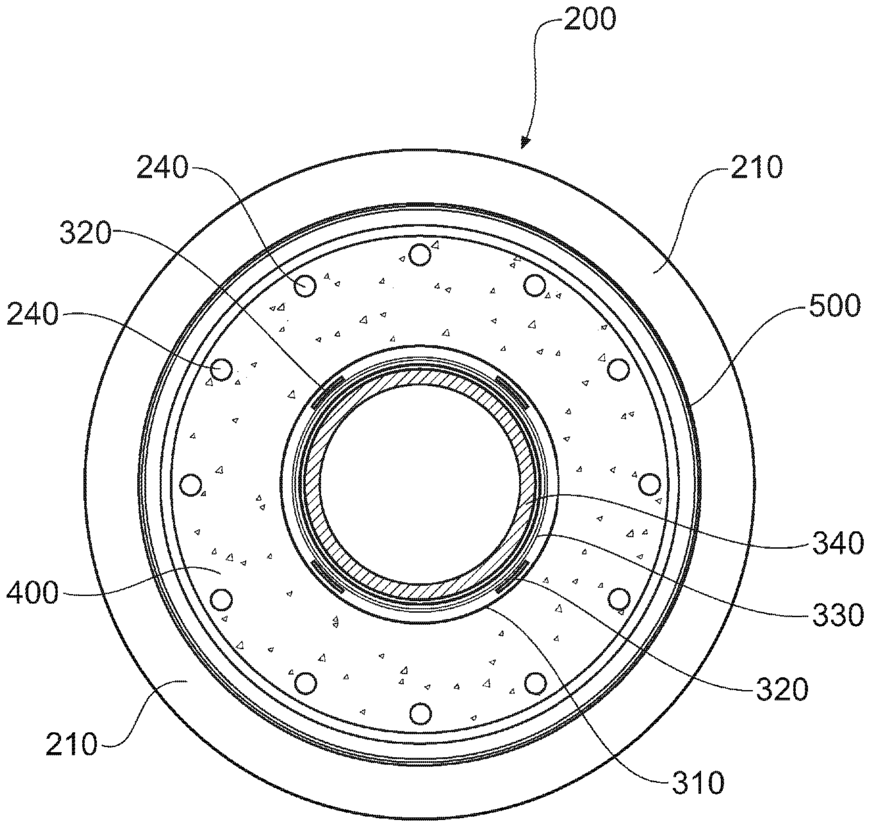
FIG. 4 is a top sectional view of the assembled fabrication assembly illustrated in FIG. 2 filled with concrete mix.

At step 110, the concrete article is cast in a fabrication assembly. Referring now to FIGS. 2 and 3, there are shown exploded and assembled views respectively of a fabrication assembly 200 consisting of, in this illustrative embodiment, a core assembly 300, two opposed tapered semi cylindrical mould portions 210 forming an outer mould assembly 280 and optional reinforcement cage 240 that seats within the tapered annular shaped cavity or moulding region 250 formed between the core assembly 300 and the joined outer mould portions 210.

Fabrication assembly 200 further includes a mould liner 500 which is configured to form an intermediate layer between the inner moulding surface 212 of the outer mould assembly 280 and the elongate concrete article being cast. In this illustrative embodiment, mould liner 500 is configured as a tapered open-ended sock or sleeve having the shape and configuration of the article being cast and will function to from a containment layer for the elongate concrete article to form a mould liner and contained elongate concrete article combination. In one example, mould liner 500 is configured to allow transport of the mould liner 500 and the contained or included concrete article combination following casting for removal from the fabrication assembly. Mould liner 500 is held upright in fabrication assembly 200 by two opposed longitudinal straps 510 extending from the top of the mould liner 500.

In another embodiment, a top region or flap portions of the mould liner 500 are folded over the top edge of the outer mould assembly 280 to retain the mould liner 500 in place during the casting process. This arrangement is typically employed where the mould liner 500 and the moulded concrete article 400 is the same or similar length as outer mould assembly 280. In other embodiments, the mould liner 500 is of a reduced length as compared to the outer mould assembly 280 and in this case longitudinal straps 510 of appropriate length may be used to retain mould liner 500 in the outer mould assembly 280 at the correct height.

In one illustrative example, the outer mould assembly 280 is 12.5 metres long which is designed to cast concrete articles of an equivalent length, however, in accordance with the present disclosure a concrete article of reduced length, say 11 metres, could be cast using the same outer mould assembly 280 but by using a reduced length mould liner 500 of equivalent length which is positioned and located within the outer mould assembly 280 using longitudinal straps 510 that extend from the mould liner as discussed above.

In an illustrative embodiment, the mould liner 500 is formed from a woven fabric material having a tensile strength (warp/weft) of greater than 2250/2000 N/50 mm where the warp extends longitudinally with respect to the mould liner and the weft extends circumferentially with respect to the mould liner. In other embodiments, the tensile strength (warp/weft) of the woven fabric material is greater than, 2500/2250 N/50 mm, 2750/2500 N/50 mm, 3000/2750 N/50 mm, 3250/3000 N/50 mm, 3500/3250 N/50 mm, 3750/3500 N/50 mm, 4000/3750 N/50 mm, 4250/4000 N/50 mm, 4500/4250 N/50 mm, 4750/4500 N/50 mm, 5000/4750 N/50 mm, 5250/5000 N/50 mm, 5500/5250 N/50 mm, 5750/5500 N/50 mm, 6000/5750 N/50 mm or 6250/6000 N/50 mm. In another embodiment, the mould liner 500 is configured with the warp of the woven fabric material extending circumferentially with respect to the mould liner and the weft extending longitudinally with respect to the mould liner.

In another embodiment, the woven fabric is formed from a synthetic plastic material selected from the group consisting of polypropylene, polyethylene, linear low density polyethylene, polyamides, high density polyethylene, polyesters, polystyrene, polyvinyl chloride and their associated copolymers and further including any mixtures of these materials. In yet another embodiment, the woven material is coated by a hydrophobic or water resistant coating. In one example, the hydrophobic material is a synthetic hydrophobic plastic material such as polyvinyl chloride (PVC) but as would be appreciated other suitable hydrophobic materials may be employed.

In one example, the woven fabric material is a polyester weave incorporating a PVC coating that is 900 grams per square metre (gsm) in weight and having a thickness of approximately 0.7 mm. In one example, mould liner 500 is formed from Polymar™ 8556 material which is typically used in applications such as the fabrication of truck tarpaulins.

A table of the properties of the Polymar™ 8556 material is set out below:

| Parameter | Value |
|---|---|
| Material | Polyester |
| Type of Coating | PVC |
| Total Weight | 900 g/m$^2$ |
| Tensile strength (warp/weft) | 4300/4000 N/50 mm |
| Tear strength (warp/weft) | 500/500 N |

In this embodiment, mould liner 500 is fabricated from a sheet of material that is cut out to have an outline corresponding to any required taper and whose edges are joined together using standard plastic ultra-high frequency welding or other plastic welding techniques such as hot plate welding using a platen. In this way, the mould liner 500 may be fabricated to high dimensional tolerances on the diameter of approximately ±1 mm.

Concrete mix is introduced in cavity 250 by concrete mix input assembly 260 consisting of elbow portion 261 having an inlet 262 to receive the concrete mix and whose outlet 263 is joined to the bottom of joined mould portions 210.

Concrete input assembly 260 further includes drain outlet 265 to allow water to drain from core assembly 200.

Core assembly 300 includes a tapered hollow core portion 340. In this example embodiment, surrounding the core portion 340 is an inflatable bladder 330 that functions to expand or extend radially outwards from the core portion 340. Attached to the bladder 330 is a plurality of elongate longitudinally extending mesh drainage strips 320 spaced around bladder 330 and extending along core portion 340 forming respective drainage channels that terminate in a collection tube 322, which together in this embodiment forms drainage means for draining water from the concrete mix during the fabrication process.

Each drainage strip 320 is formed from a plastic mesh material having a cell dimension of approximately 3 mm×3 mm and having a width of approximately 30 mm which allows water to drain along the drainage strip. In this illustrative embodiment, the plastic mesh is formed from high-density polyethylene (HDPE) but as would be appreciated other types of suitable materials may be employed. In this illustrative embodiment, four drainage strips 320 are employed but this number may be varied depending on the size and configuration of the pole and expected drainage rates. Surrounding the bladder 330 and drainage strip 320 arrangement is a filter membrane 310 which again extends substantially along the length of core portion 340. On assembly, collection tube 322 is inserted through drain outlet 265 to receive water from drainage strips 320.

In this illustrative embodiment, directed to fabricating a 12.5 metre power pole, filter membrane 310 is a woven polyester fabric having a mesh or pore size of 52 μm but this may be varied depending on the concrete mix and type of pole being fabricated. Filter membrane 310 is held in place by a suspender arrangement (not shown) that attaches to the top of core portion 340 consisting of longitudinal strapping that is used to transfer the load when the bladder 330 and filter membrane 310 are removed from the moulded product. Filter membrane 310 in this illustrative embodiment functions as both a pressure drop means to provide a pressure drop that in part controls the transfer of water across the membrane during dewatering as well as providing a filtering means to prevent loss of fines and cement during the filling process.

Concrete mix is then pumped into the fabrication assembly 200 with a first stage dewatering of the concrete mix occurring by a controlled release from the combined head pressure as a result of the concrete mix being pumped generally upwardly against gravity and the pump pressure as concrete mix is introduced into cavity 250. As a result, a pressure drop is induced across the filter membrane 310 resulting in liquid transferring through the filter membrane 310 to be collected by the drainage means in the form of drainage strips 320 located between the core portion 340 and filter membrane 310.

The pressure drop across filter membrane 310 is a function of the head pressure, water to cement ratio, cement mix design, pumping pressure and related pump time. For a given configuration, the primary control variable is the pumping pressure of the concrete mix which also determines how quickly the concrete mix will rise in the mould cavity 250. The pumping pressure is controlled so as to allow liquid to escape from the concrete mix through filter membrane 310 to be drained by drainage strips 320 but not so fast that the drainage means is overwhelmed taking into account that the pressure drop will vary with the height of the fabrication assembly 200.

The concrete mix then goes through a second stage dewatering after fabrication assembly 200 has been substantially filled with the concrete mix by the action of a radial compressing means in the form of bladder 330 located between the core portion 340 of fabrication assembly 200 and filter membrane 310 which is inflated to a pressure of 80 psi and functions to compress the concrete mix between the bladder 330 of the fabrication assembly 200 and the mould liner 500 which lies against outer mould portions 210 of the fabrication assembly 200. This compression force causes the remaining free water in the concrete mix to migrate through the mix and through filter membrane 310 where it is collected by drainage strips 320.

As discussed previously, in the absence of a mould liner 500, the time taken before the concrete is strong enough for the outer mould assembly 280 to be stripped is dependent on a number of factors including the ambient temperature, concrete temperature and mould temperature, where these factors all affect the hydration speed of the concrete, as well as the materials used in the concrete. As would be appreciated, these operating parameters can be difficult to control exactly and operator judgement is therefore required to determine when the cast concrete article is ready for stripping of the mould assembly. If the mould assembly is stripped too early this will impact on the ability of the mould surface to release from the surface of the concrete article and impact the surface finish of the concrete article.

Figure 5:
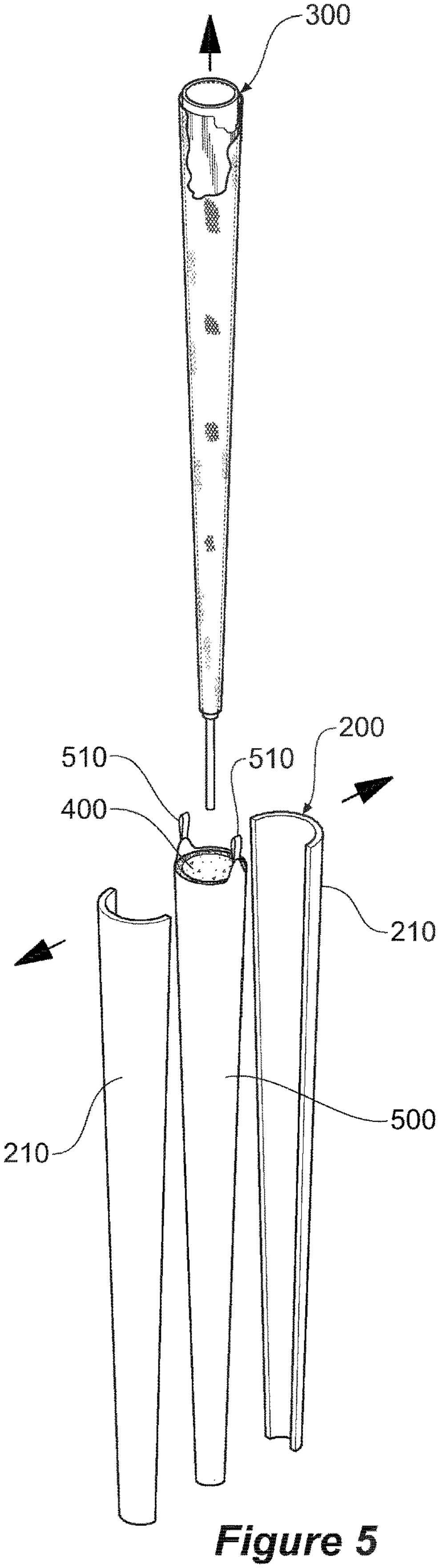
FIG. 5 is an exploded perspective view of the opened fabrication assembly following casting and depicting the mould liner containing the elongate concrete article in accordance with an illustrative embodiment.

At step 120, the outer mould assembly 280 and core assembly 300 is stripped from the mould liner 500 and contained concrete article 400 combination. As can be seen in FIG. 5, stripping of the mould assembly 280 first involves raising core assembly 300 from fabrication assembly 200 before the opening of mould portions 210. In accordance with this illustrative embodiment, the mould liner 500 forms an outer containment layer or sleeve that encompasses concrete pole 400 and which in this example allows the mould liner 500 and the contained concrete pole 400 combination to be removed or transported together from the fabrication assembly 200 in an upright configuration following stripping of the outer mould assembly 280. In another embodiment, the mould liner 500 and the contained concrete pole 400 remain held in an upright configuration and the fabrication assembly 200 is removed.

The pole is supported by two reinforcing bars in line with the mould liner straps 510 and the mould liner 500 and concrete pole 400 are together transferred for further curing.

As would be appreciated, as the outer mould assembly 280 is in contact with mould liner 500 during the stripping process, the removal of the outer mould assembly 260 will not be as dependent on the exact strength of the concrete pole 400 as the outer mould assembly 260 will release consistently from the mould liner 500. As a result, the stripping process can proceed even though the concrete pole 400 contained within the mould liner 500 would not have attained the required compressive strength in order to be ready for stripping using a standard liner arrangement. In one example, the mould liner 500 is stripped from the concrete pole 400 once the concrete has reached a compressive strength of 25 kPa. In other embodiments, the mould liner 500 is stripped once the compressive strength of the concrete has reached one of the following values including 100 kPa, 200 kPa, 300 kPa, 400 kPa, 500 kPa, 600 kPa, 700 kPa, 800 kPa, 900 kPa or 1 MPa.

In this illustrative embodiment, directed to the fabrication of a 12.5 metre hollow section tapered cylindrical concrete pole having a general wall thickness of 65 mm, the time required to fill the mould with concrete is approximately 4-6 minutes followed by 8 minutes to then dewater the concrete as discussed above, meaning that the outer mould assembly 280 may be stripped approximately 12-14 minutes following filling of the mould and furthermore that this timing is consistent.

In process terms, use of the mould liner 500 increases the robustness of the casting process as the stripping step is decoupled from the exact state of the concrete pole 400 and as a consequence operator judgement and assessment of the hardness of the concrete pole 400 is not critical with the fabrication process as a result becoming less operator dependent.

Figure 6:
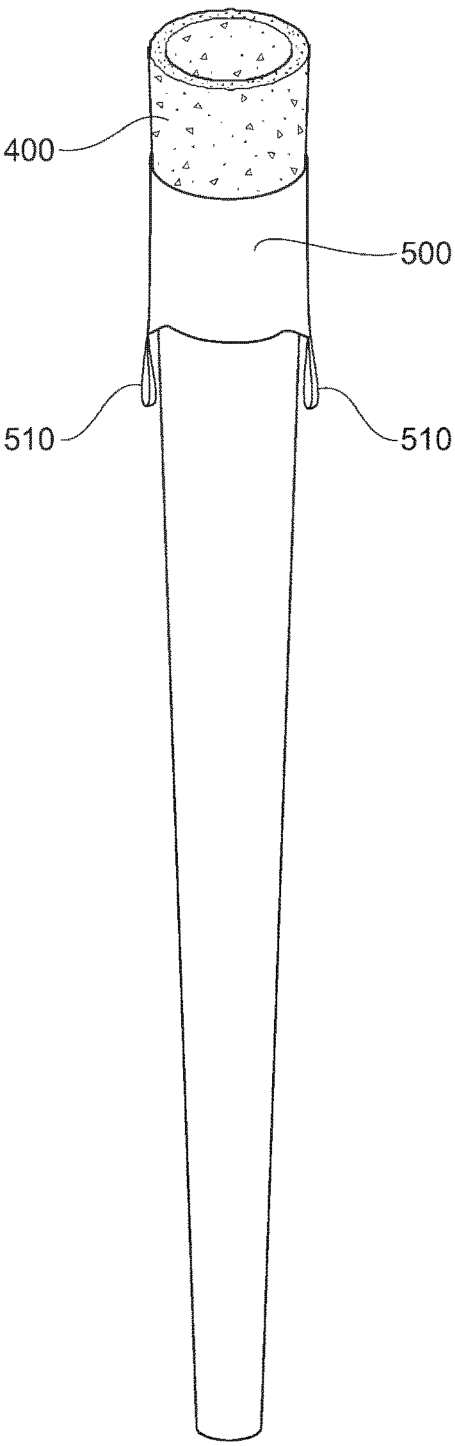
FIG. 6 is a detailed perspective view depicting the removal of the mould liner from the elongate concrete article in accordance with an illustrative embodiment.

At step 130, the mould liner 500 is removed from the concrete pole 400. In one example embodiment, the mould liner 500 is removed from concrete pole 400 approximately 2-3 hours following the removal of the mould liner 500 and contained concrete pole 400 combination from the fabrication assembly 200 and prior to lowering the concrete article from a vertical to a horizontal orientation. This exact time will depend on the rate of curing and ambient temperature of the environment following stripping of the mould assembly 280. Referring now to FIG. 6, the mould liner 500 is removed from the concrete pole 400 as a unitary item by peeling the mould liner 400 from the base of the taper. In this manner, the mould liner 500 may be removed as a unitary item without requiring any cutting of the liner material.

Once the mould liner 500 has been removed it may be then cleaned and reused. In this manner, the mould liner 500 may be removed without requiring a release agent or further cleaning due to its flexibility where flaky concrete residue will break away in the peeling process. In another embodiment, where re-use of mould liner 500 is not required, mould liner 500 is removed by cutting the mould liner material.

The Applicant has found that even though the mould liner is formed from a flexible woven material that would not be expected to have the same moulding properties as moulding assembly 280, surprisingly the tensile strength of the mould liner is able to hold the concrete in compression following stripping of the mould assembly 280. As a result, this allows the concrete article, which in this example embodiment weighs some 1800 kg, to begin curing. The presence of the mould liner 500 also reduces premature drying out of the concrete during the curing process resulting in a stronger cast concrete article that has a better surface finish for comparable curing periods.

In the above described embodiment, the concrete pole has attained a sufficient hardness so that it can be lowered from a vertical orientation to a horizontal orientation in 2-3 hours as compared to the process described in International Patent Application No. PCT/AU2014/000404 (WO 2014/165926), where the concrete pole made with identical parameters was maintained in a substantially vertical orientation of 5-6 hours before it could be transitioned. As would be appreciated, the storage of poles in a vertical orientation is less cost effective than storing the poles in a horizontal configuration where they can be conveniently stacked on the ground.

For final curing, the concrete pole 400 is steam cured in a larger chamber consisting of separate insulated chambers to prevent temperature loss during the loading and unloading of poles. The steam lines provide steam to each of the chambers controlling the rise and fall in humidity and temperature of each individual chamber so poles can be steam cured for a predetermined period of time. Once the pole has been steam cured, the pole is lifted to be stored in storage racks for a further 6 hour curing or setting period at which point the pole can be finally cleaned and go through a final quality inspection.

As would be appreciated, the adoption of a mould liner provides a number of significant advantages over prior fabrication processes. As discussed above, use of the mould liner 400 decouples the exact state of the concrete from the stripping process making this process much less dependent on operator judgement. This makes it much easier to batch the fabrication process as the mould liner 500 and contained concrete pole 400 combination may be removed from the fabrication assembly 200 after a predetermined duration independent of the exact strength of the concrete. This decoupling also results in the fabrication process being much less sensitive to process parameters such as dependency on temperature. As a result, the requirement for ancillary equipment to maintain temperature during the fabrication process such as equipment to heat or chill water or aggregates is greatly reduced.

Additionally, concrete poles tested for their hardness performance at 28 days following casting were found to have an increased hardness, again with identical process parameters. Additionally, the Applicant has found that cracking in the concrete article has been substantially eliminated. It is hypothesised by the Applicant that the continued presence of the mould liner layer following stripping of the outer mould assembly 280 maintains the moisture in the concrete allowing for increased thermal conductance from the hot air vapour during the initial curing process and further holds the concrete in a state of compression resulting in improved strength and long term durability.

As the mould liner 500 can be fabricated to a high dimensional tolerance and in effect functions as a moulding layer during the casting process, the tolerances and sealing requirements of the outer mould assembly 280 can be reduced as the outer mould assembly 280 does not need to form the pressure vessel to contain the forces of the concrete pumping and the increasing head pressure during the casting process.

In addition, the complex and costly mechanism required to first support the cylindrical mould portions 210 and which is then required to open the mould portions 210 in a direction that maintains the individual mould portions 210 both parallel and horizontal with respect to each other in the stripping process so as not to damage the uncured concrete pole 400 is now not required. This is because the concrete pole 400 is now contained by the mould liner 500. As such, the outer mould assembly 280 functions as a mould liner support structure, where the configuration of the mould liner may be varied for the same outer mould assembly 280 as will be described below.

Figure 7A:
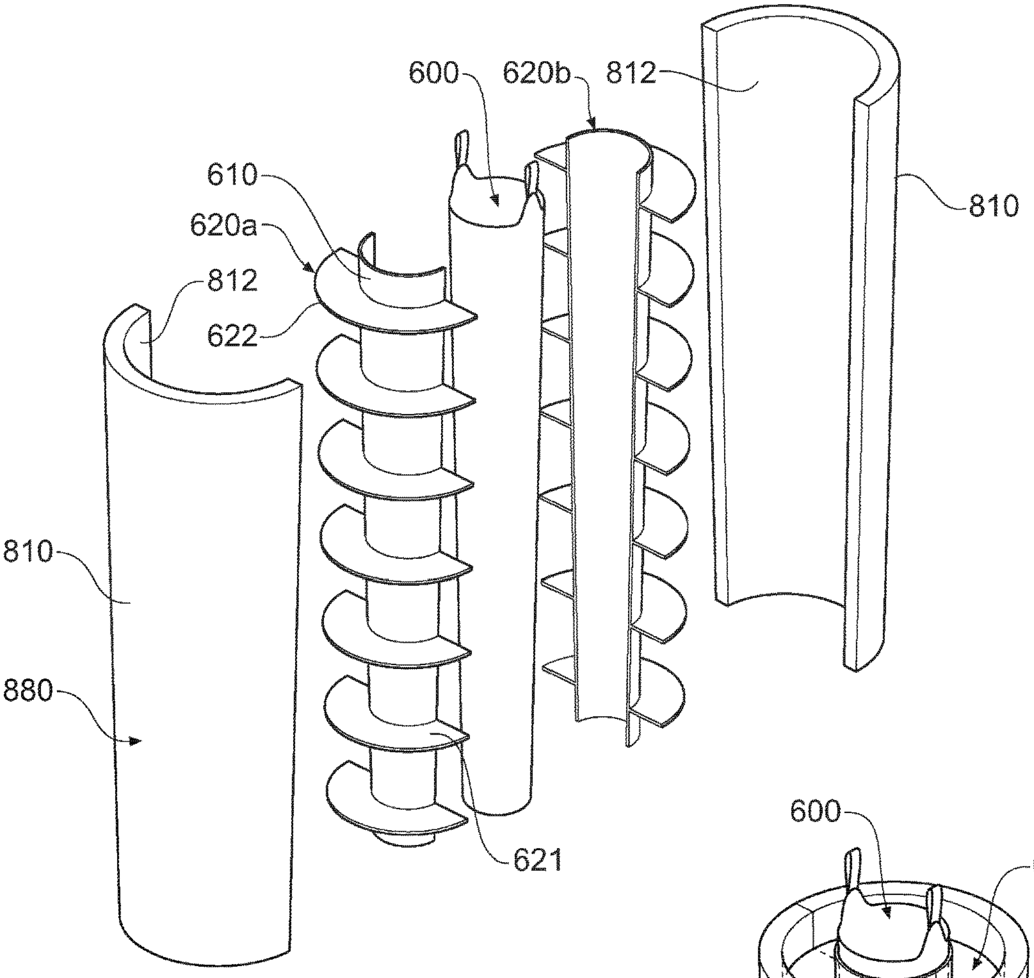
FIGS. 7A and 7B show exploded and assembled perspective views respectively of an outer mould assembly incorporating a mould liner in accordance with a further illustrative embodiment.
Figure 7B:
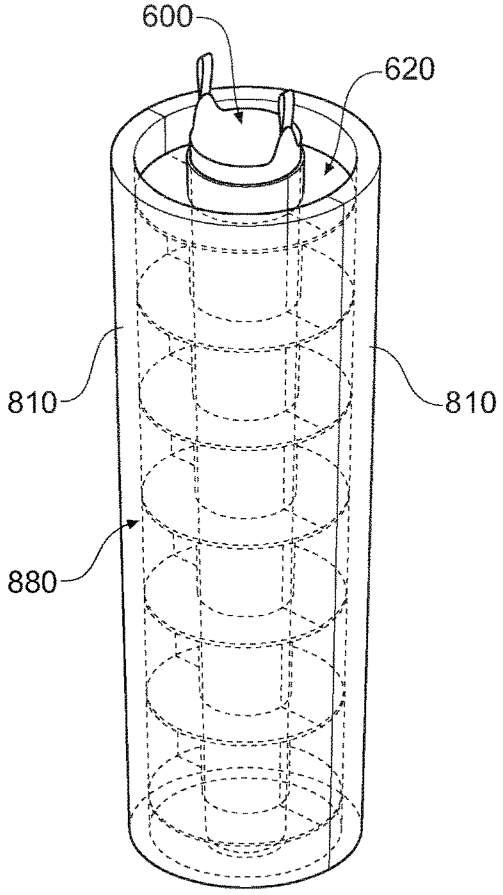

Referring now to FIGS. 7A and 7B, there are shown exploded and assembled perspective views of an outer mould assembly 880 incorporating a mould liner 600 according to a further illustrative embodiment. In this example, mould liner 600 is configured to produce a concrete pole having a smaller diameter than that determined by the inner surface 812 of the semi cylindrical mould portions 810 of the outer mould assembly 880. In this illustrative embodiment, mould liner 600 is once again configured as an open-ended tapered sleeve or sock portion but further includes a mould assembly interface arrangement 620 that interfaces between the mould liner 600 for moulding a concrete article having a first configuration as compared to the outer mould assembly 880 which has a configuration for moulding a concrete article of a different configuration. In the case of a hollow concrete article a further core assembly such as described above (not shown) would be adopted.

In this illustrative embodiment, the mould liner 600 is for moulding a concrete article having a different diameter and degree of taper as compared to what would be moulded by the outer mould assembly 880 in the absence of mould liner 600. In this illustrative embodiment, mould assembly interface arrangement 620 comprises two opposed semi cylindrical interface portions 620*a*, 620*b* each having a longitudinally extending liner receiving portion 610 and a number of longitudinally spaced annular support or bracing discs 621 extending radially outwardly from the liner receiving portion 610 and whose outer diameter 622 matches the inner diameter of the inner surface 812 of the closed outer mould assembly 880 at respective locations along the mould assembly 880.

In this example, the outer diameter 622 of each interface portion 620*a*, 620*b* tapers inwardly moving down the outer mould assembly 880 in order to match its degree of taper but in this example the degree of taper of the liner receiving portion 610 is greater. As would be appreciated, mould assembly interface arrangement 620 may be configured so that the moulded concrete article has no taper or alternatively the same degree of taper as the outer mould assembly 880.

While in this illustrative embodiment, mould assembly interface arrangement 620 includes annular support discs 621 it will be appreciated that other support or bracing arrangements that transfer the radial compressive forces from the outer mould assembly 880 during casting to the liner receiving portion 610 are within the scope of this disclosure. In this manner, the outer mould assembly 880 which is a large scale heavy structure consisting in one embodiment of steel sections of 8 mm thickness may be used to fabricate poles of many different configurations through the combination of interface arrangement 620 which can be configured to be relatively lightweight (eg, steel sections of 3-4 mm) and swappable within the outer mould assembly 880 and mould liner 600.

In this arrangement, interface arrangement 620 functions to maintain or mould the shape of the mould liner 600 which in turn functions to provide a containment layer to enclose the concrete during the casting process. As a result, neither the outer mould assembly 880 or the interface arrangement 620 are required to be sealed together as the mould liner 600 performs this function by containing the concrete during the casting process.

Figure 8A:
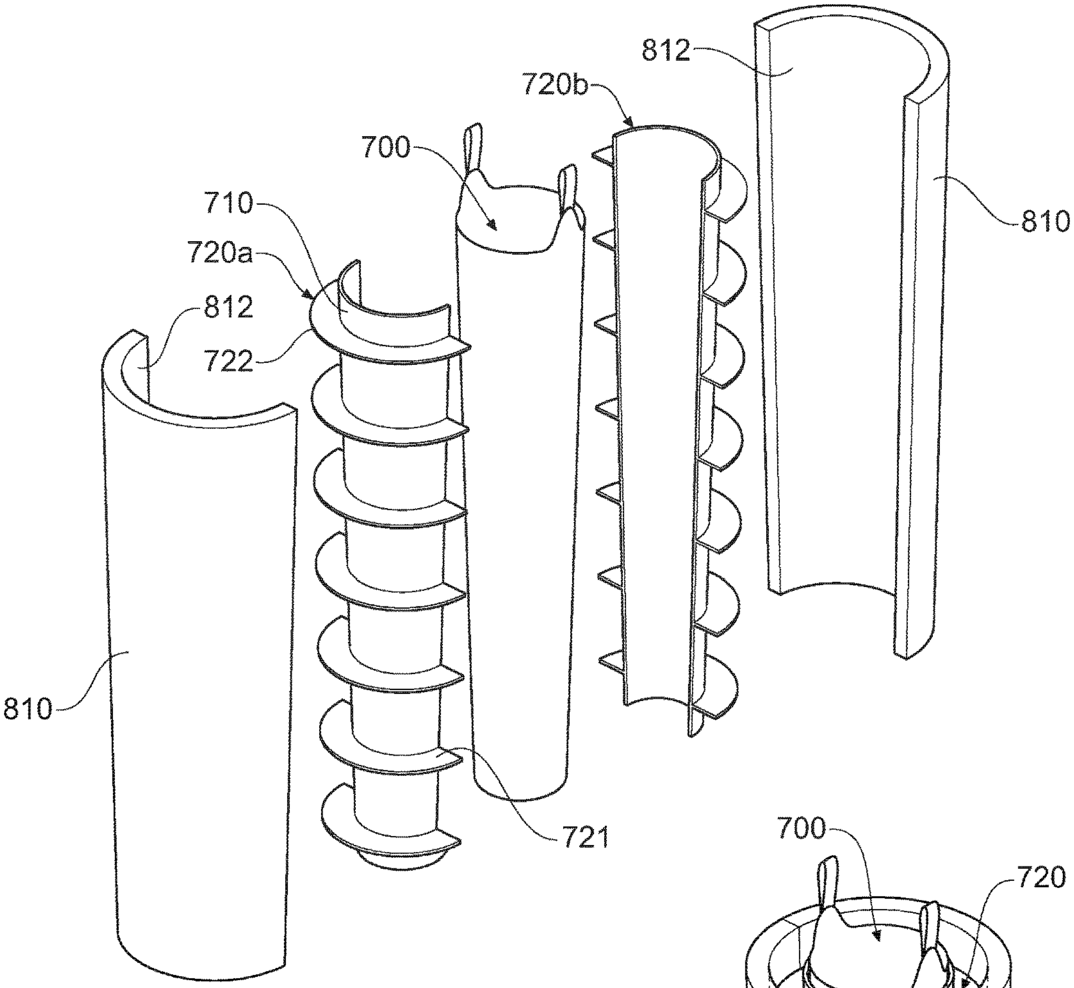
FIGS. 8A and 8B show exploded and assembled perspective views respectively of the outer mould assembly illustrated in FIGS. 7A and 7B incorporating a mould liner in accordance with yet another illustrative embodiment.
Figure 8B:
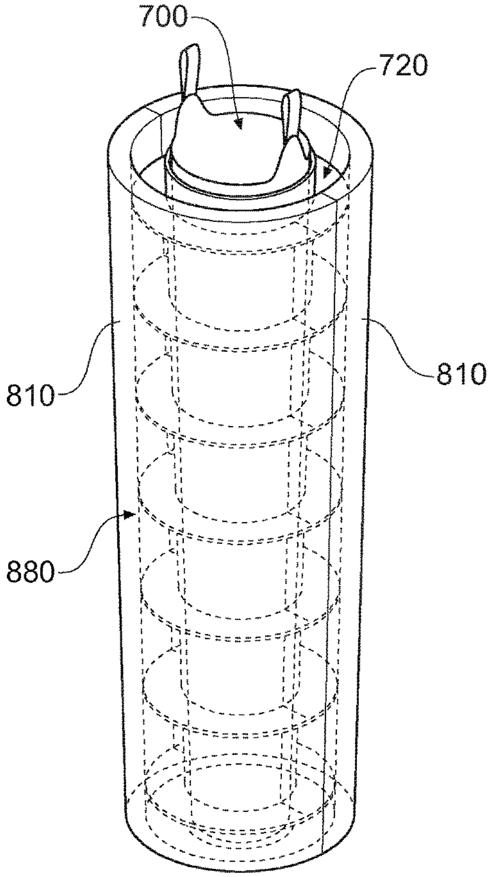

Referring now to FIGS. 8A and 8B, there are shown exploded and assembled perspective views of an outer mould assembly 880 incorporating a mould liner 700 according to a further illustrative embodiment. In this example, mould liner 700 is configured to produce a concrete pole having a larger diameter than that produced by the mould liner 600 illustrated in FIGS. 7A and 7B. Similar to mould liner 600, the mould assembly interface arrangement 720 comprises two opposed semi cylindrical interface portions 720*a*, 720*b* each having a longitudinally extending liner receiving portion 710 and a number of longitudinally spaced annular support or bracing discs 721 extending radially outwardly from the liner receiving portion 710 and whose outer diameter 722 matches the inner diameter of the inner surface 812 of the closed outer mould assembly 880 at respective locations along the mould assembly 880.

As would be appreciated, and as discussed above, the same outer mould assembly 880 having reduced sealing requirements and larger tolerances may be employed to manufacture a number of different types of concrete articles as a result improving efficiency and reducing costs. While, the above described outer mould assemblies 280, 880 are tapered, costs can be further reduced by making these of a simple cylindrical configuration and yet this arrangement can still be used to fabricate tapered articles as required by varying the mould assembly interface arrangements as required.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope of the invention as set forth and defined by the following claims.

The invention claimed is:

1. A mold liner for a fabrication assembly, the fabrication assembly for fabricating an elongate concrete article in a substantially upright orientation and including a core assembly and an outer mold assembly defining a mold cavity between the core assembly and an inner molding surface of the outer mold assembly with the outer mold assembly being separable following casting of the elongate concrete article to strip the outer mold assembly from the elongate concrete article, the mold liner during casting forming an intermediate layer between the inner molding surface of the outer mold assembly and the elongate concrete article being cast, wherein on stripping of the core and outer mold assemblies following casting, the mold liner is adapted to form an outer containment layer to the elongate concrete article to form a mold liner and contained elongate concrete article combination, wherein the mold liner comprises one or more attachment portions located at a top portion of the mold liner for the removal and transport of the mold liner and contained elongate concrete article combination from the fabrication assembly in an upright configuration.

2. The mold liner of claim 1, wherein the mold liner is formed as a sleeve having the shape and configuration of the elongate concrete article being cast.

3. The mold liner of claim 1, wherein the mold liner is removable from the elongate concrete article as a unitary item following casting.

4. The mold liner of claim 3, wherein the mold liner is removed from the elongate concrete article by peeling the mold liner from the elongate concrete article.

5. The mold liner of claim 1, wherein the mold liner is formed from a woven fabric material.

6. The mold liner of claim 5, wherein the woven fabric material has a tensile strength (warp/weft) of greater than 2250/2000 N/50 mm.

7. The mold liner of claim 5, wherein the woven fabric material is formed from a synthetic plastic material.

8. The mold liner of claim 1, wherein the mold liner includes a hydrophobic coating.

9. The mold liner of claim 8, wherein the hydrophobic coating is a synthetic hydrophobic plastic material.

10. The mold liner of claim 1, wherein the mold liner is formed from a single sheet of material.

11. A fabrication assembly for fabricating an elongate concrete article in a substantially upright configuration, including:
a core assembly;
an outer mold assembly defining a mold cavity between the core assembly and an inner molding surface of the outer mold assembly, the outer mold assembly being separable following casting of the elongate concrete article to strip the outer mold assembly from the elongate concrete article;
a mold liner forming an intermediate layer between the inner molding surface of the outer mold assembly and the elongate concrete article being cast, the mold liner on stripping of the core and outer mold assemblies forming an outer containment layer to the elongate concrete article to form a mold liner and contained elongate concrete article combination, wherein the mold liner comprises one or more attachment portions located at a top portion of the mold liner for the removal and transport of the mold liner and contained elongate concrete article combination from the fabrication assembly in an upright configuration; and
a concrete mix input assembly for introducing a concrete mix into the mold cavity.

12. The fabrication assembly of claim 11, wherein the mold liner is formed as a sleeve having the shape and configuration of the elongate concrete article being cast.

13. The fabrication assembly of claim 11, wherein the mold liner is removable from the elongate concrete article as a unitary item following casting.

14. The fabrication assembly of claim 13, wherein the mold liner is removed from the elongate concrete article by peeling the mold liner from the elongate concrete article.

15. The fabrication assembly claim 11, wherein the mold liner is formed from a woven fabric material.

16. The fabrication assembly of claim 15, wherein the woven fabric material has a tensile strength (warp/weft) of greater than 2250/2000 N/50 mm.

17. The fabrication assembly of claim 15, wherein the woven fabric material is formed from a synthetic plastic material.

18. The fabrication assembly of claim 11, wherein the mold liner includes a hydrophobic coating.

19. The fabrication assembly of claim 18, wherein the hydrophobic coating is a synthetic hydrophobic plastic material.

20. The fabrication assembly of claim 18, wherein the mold liner is formed from a single sheet of material.

21. The fabrication assembly of claim 11, further including a mold assembly interface arrangement located between the outer mold assembly and the mold liner to mold a concrete article having a different configuration to that of the outer mold assembly.

22. The fabrication assembly of claim 21, wherein the mold assembly interface arrangement is separable following casting of the elongate concrete article.

23. The fabrication assembly of claim 21, wherein the mold assembly interface arrangement transfers the radial compressive forces from the outer mold assembly to maintain the shape of the mold liner during the casting process.

24. A method for fabricating an elongate concrete article, including:
casting a concrete article in a substantially upright configuration in a fabrication assembly, the fabrication assembly including:
a core assembly;
an outer mold assembly defining a mold cavity between the core assembly and an inner molding surface of the outer mold assembly, the outer mold assembly being separable following casting of the elongate concrete article to strip the outer mold assembly from the elongate concrete article; and
a mold liner forming an intermediate layer between the inner molding surface of the outer mold assembly and the elongate concrete article being cast, the mold liner comprising one or more attachment portions located at a top portion of the mold liner;
stripping the core and outer mold assemblies from the mold liner and elongate concrete article combination following the introduction of concrete into the mold cavity, wherein the mold liner forms an outer containment layer to the elongate concrete article to contain the elongate concrete article to form a mold liner and contained elongate concrete article combination;
removing and transporting the mold liner and contained elongate concrete article combination from the fabrication assembly in an upright configuration by attaching to the attachment portions; and
removing the mold liner from the elongate concrete article for post processing.

25. The method of claim 24, wherein the mold liner is formed as a sleeve having the shape and configuration of the elongate concrete article being cast.

26. The method of claim 24, wherein the mold liner is removed from the elongate concrete article as a unitary item.

27. The method of claim 26, wherein removing the mold liner includes peeling the mold liner from the elongate concrete article.

28. The method of claim 24, where casting the concrete article includes:
introducing the concrete mix into the fabrication assembly; and
dewatering the introduced concrete in a two stage dewatering process.

* * * * *